(12) United States Patent
Hu et al.

(10) Patent No.: US 11,921,334 B2
(45) Date of Patent: Mar. 5, 2024

(54) ALIGNMENT STRUCTURE OF OPTICAL ELEMENT

(71) Applicant: FOCI FIBER OPTIC COMMUNICATIONS, INC., Hsinchu (TW)

(72) Inventors: Ting-Ta Hu, Hsinchu (TW); Hsu-Liang Hsiao, Hsinchu (TW); Po-Yi Wu, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 29 days.

(21) Appl. No.: 17/684,799

(22) Filed: Mar. 2, 2022

(65) Prior Publication Data

US 2023/0221509 A1 Jul. 13, 2023

(30) Foreign Application Priority Data

Jan. 12, 2022 (TW) ................................ 111200443

(51) Int. Cl.
*G02B 6/42* (2006.01)
(52) U.S. Cl.
CPC ......... *G02B 6/4243* (2013.01); *G02B 6/4214* (2013.01)
(58) Field of Classification Search
CPC ...................................................... G02B 6/42
USPC .......................................................... 385/33
See application file for complete search history.

(56) References Cited

U.S. PATENT DOCUMENTS

| 4,142,776 | A | * | 3/1979 | Cherin | G02B 6/3881 385/59 |
| 4,146,301 | A | * | 3/1979 | Cherin | G02B 6/3806 385/59 |
| 4,611,886 | A | * | 9/1986 | Cline | G02B 6/4255 250/227.24 |
| 5,216,741 | A | * | 6/1993 | Blijleven | G02B 6/3885 65/432 |
| 5,666,446 | A | * | 9/1997 | Kragl | G02B 6/138 385/14 |
| 5,732,173 | A | * | 3/1998 | Bylander | G02B 6/3806 385/83 |
| 6,961,504 | B2 | * | 11/2005 | Matsumoto | G02B 6/3885 385/137 |
| 9,645,331 | B1 | * | 5/2017 | Kim | G02B 6/4243 |
| 9,766,416 | B1 | * | 9/2017 | Kim | G02B 6/34 |
| 9,971,096 | B2 | * | 5/2018 | Shastri | G02B 6/30 |

(Continued)

*Primary Examiner* — Kaveh C Kianni
(74) *Attorney, Agent, or Firm* — Lin & Associates Intellectual Property, Inc.

(57) ABSTRACT

An alignment structure of optical element is provided, including: an optical fiber, having a parallel fiber segment and a plurality of bare fiber segments; a cover plate, provided with a plurality of side-by-side guide grooves and a plurality of first coupling parts, the bare fiber segments of the optical fiber being arranged in the corresponding guide grooves, cross-sectional shapes of the guide grooves being at least one of U-shaped or V-shaped; and a silicon chip, provided with lines and a plurality of second coupling parts; when the cover plate is matched with the silicon chip, the first coupling parts and the second coupling parts being coupled and positioned with each other respectively, and the optical fiber being fixed between the silicon chip and the cover plate. As such, precise positioning and rapid assembly are achieved.

6 Claims, 11 Drawing Sheets

(56) References Cited

U.S. PATENT DOCUMENTS

| | | | |
|---|---|---|---|
| 10,782,474 B2* | 9/2020 | Brusberg | G02B 6/136 |
| 10,942,316 B1* | 3/2021 | Feng | G02B 6/3839 |
| 2003/0133688 A1* | 7/2003 | Wing Leung | G02B 6/3885 |
| | | | 385/137 |
| 2004/0105650 A1* | 6/2004 | Imaki | G02B 6/3636 |
| | | | 385/137 |
| 2005/0117847 A1* | 6/2005 | Ono | G02B 6/30 |
| | | | 385/49 |
| 2006/0291793 A1* | 12/2006 | Carpenter | G02B 6/3652 |
| | | | 385/137 |
| 2007/0206288 A1* | 9/2007 | Jacobowitz | B29D 11/00365 |
| | | | 359/619 |
| 2018/0217333 A1* | 8/2018 | Watté | G02B 6/3885 |
| 2018/0267255 A1* | 9/2018 | Butler | G02B 6/3885 |
| 2021/0055490 A1* | 2/2021 | Bennett | G02B 6/368 |
| 2021/0157019 A1* | 5/2021 | Shen | H01R 33/92 |
| 2023/0123751 A1* | 4/2023 | Vallance | G02B 6/423 |
| | | | 385/52 |

* cited by examiner

ALIGNMENT STRUCTURE OF OPTICAL ELEMENT

BACKGROUND OF THE INVENTION

1. Field of the Invention

The present invention relates generally to the technical field of optical elements, and more particularly, to an alignment structure of optical element.

2. The Prior Arts

With the rapid development of the Internet and mobile communications, the demand for a large amount of data transmission has also come. The speed of data transmission through electronic signals seems to have reached a bottleneck. Optical signals are used on the backbone of data transmission to carry out data transmission, which has become the trend of the future. Optical signal transmission elements based on Silicon Optical Bench (SiOB) are also widely used in various products. In such products, the cost of optical connection between two silicon chips or the optical connection between the silicon chip and the optical fiber is usually much higher than the production cost of the silicon chip or the optical fiber, because it takes a long time to calibrate and align. Therefore, the silicon chip packaging alignment gradually gains attention and various packaging alignment methods or structures are derived. The present invention discloses a fast and accurate structure to reduce the cost of packaging.

SUMMARY OF THE INVENTION

A primary objective of the present invention is to provide an alignment structure of optical element, mainly using a first coupling part, a second coupling part and a guide groove between various components of the optical element, such as silicon chip, cover plate and optical fiber so as to enable each component to be positioned relative to one another during assembly, to shorten the calibration and alignment time, thereby improving the assembly time and efficiency.

In order to achieve the above objective, the present invention is an alignment structure of optical element, including: an optical fiber, having a parallel fiber segment and a plurality of bare fiber segments; a cover plate, provided with a plurality of side-by-side guide grooves and a plurality of first coupling parts, the bare fiber segments of the optical fiber being arranged in the corresponding guide grooves, cross-sectional shapes of the guide grooves being at least one of U-shaped or V-shaped; and a silicon chip, provided with lines and a plurality of second coupling parts; when the cover plate is matched with the silicon chip, the first coupling parts and the second coupling parts being coupled and positioned with each other respectively, and the optical fiber being fixed between the silicon chip and the cover plate.

In a preferred embodiment, when the first coupling part is a positioning protrusion formed upwardly on a surface of the cover plate, the second coupling part is a positioning groove formed downwardly on a surface of the silicon chip.

In a preferred embodiment, when the first coupling part is a positioning groove formed downwardly on a surface of the cover plate, the second coupling part is a positioning protrusion formed upwardly on a surface of the silicon chip.

In a preferred embodiment, the positioning protrusion has at least one inclined surface, and the positioning groove also has an inclined surface at a corresponding position.

In a preferred embodiment, the plurality of side-by-side guide grooves are formed in the middle of the cover plate, and the plurality of first coupling parts are formed on both sides of the surface.

In a preferred embodiment, the cover plate also extends a thin substrate, and the thin substrate can be fixed in contact with the parallel fiber segment of the optical fiber to maintain the overall firmness.

In a preferred embodiment, the alignment structure further includes a lens, installed on the guide groove of the cover plate and in contact with the bare fiber segments of the optical fiber, and the lens is at least one of through lens, a refractive lens or a reflective lens.

In a preferred embodiment, the lens is further formed with a mounting convex portion, the mounting convex portion is shaped to match the shape of the plurality of side-by-side guide grooves, and the lens is set on the plurality of guide grooves by the mounting convex portion during assembly.

In a preferred embodiment, the silicon chip has a stepped-down mounting platform, the plurality of second coupling parts are arranged at the mounting platform, and the cover plate is installed with the optical fibers and lens covers on the mounting platform during assembly.

In a preferred embodiment, the alignment structure further includes a lens, the lens being at least one of a through lens, a refractive lens or a reflective lens; the cover plate is formed with an alignment groove, located at one end of the guide groove; during assembling, the lens is arranged in the alignment groove and fixed between the cover plate and the silicon chip.

In a preferred embodiment, the lens also forms a flat mounting surface, the longitudinal direction of the alignment groove being a tapered hole, and the shape of bottom surface of the alignment groove matching the shape of the mounting surface; when the lens is placed in the alignment groove, the mounting surface accurately fitting the bottom surface of the alignment groove.

In a preferred embodiment, the alignment groove does not transversely penetrate the cover plate, opening direction of the alignment groove is the same as opening direction of the guide groove, the lens is arranged in the alignment groove, and the alignment groove forms a reflective surface, light signals passing through the lens can change the path through the reflective surface.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The technical solution of the present invention will be clearly and completely described below with reference to the specific embodiments and the accompanying drawings. It should be noted that when an element is referred to as being "mounted or fixed to" another element, it means that it can be directly on the other element or an intervening element may also be present. When an element is referred to as being "connected" to another element, it means that it can be directly connected to the other element or intervening elements may also be present. In the illustrated embodiment, the directions indicated up, down, left, right, front and back, etc. are relative, and are used to explain that the structures and movements of the various components in such cases are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
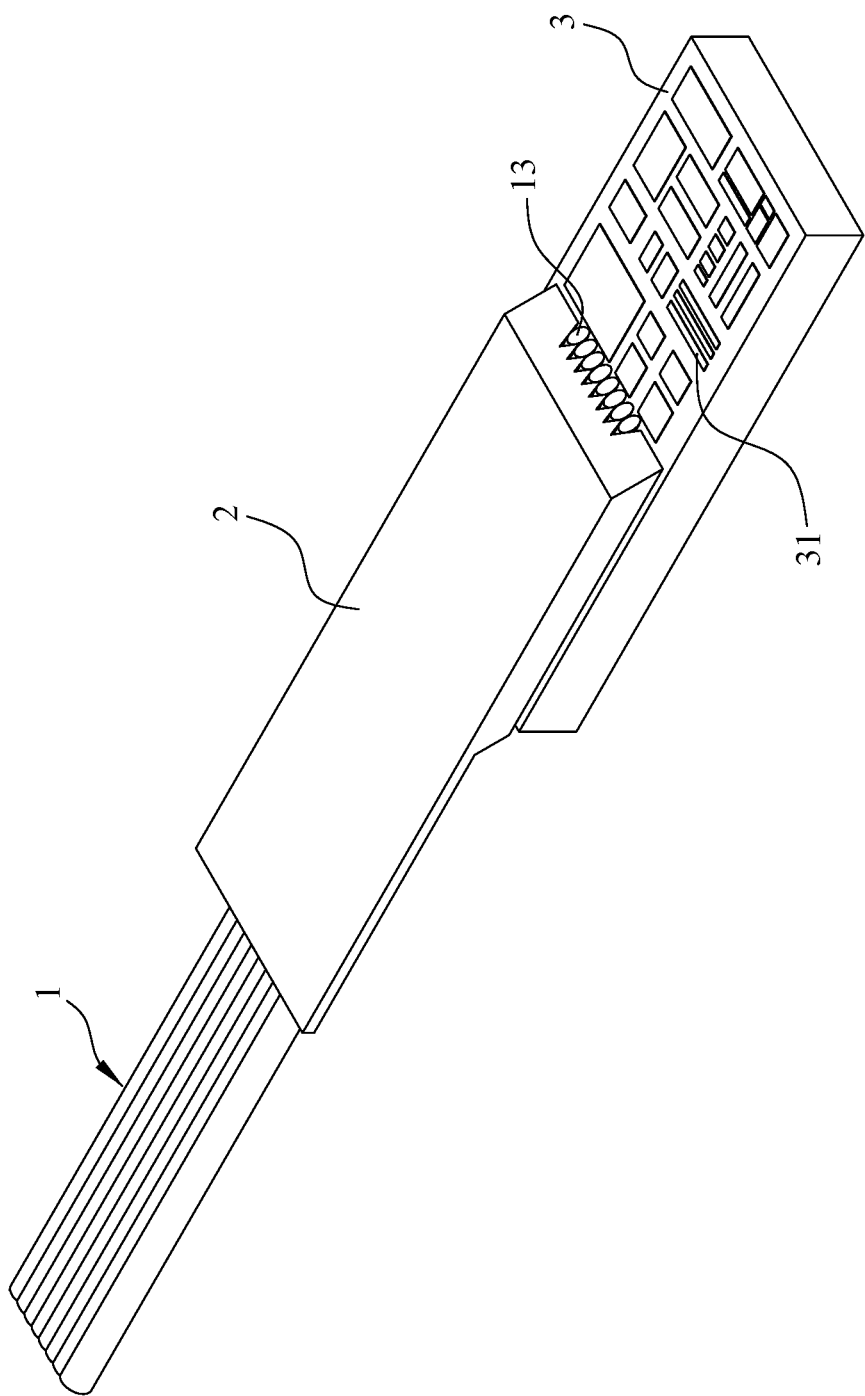
FIG. 1 is a perspective view of a first embodiment of an alignment structure of optical element of the present invention.
Figure 2:
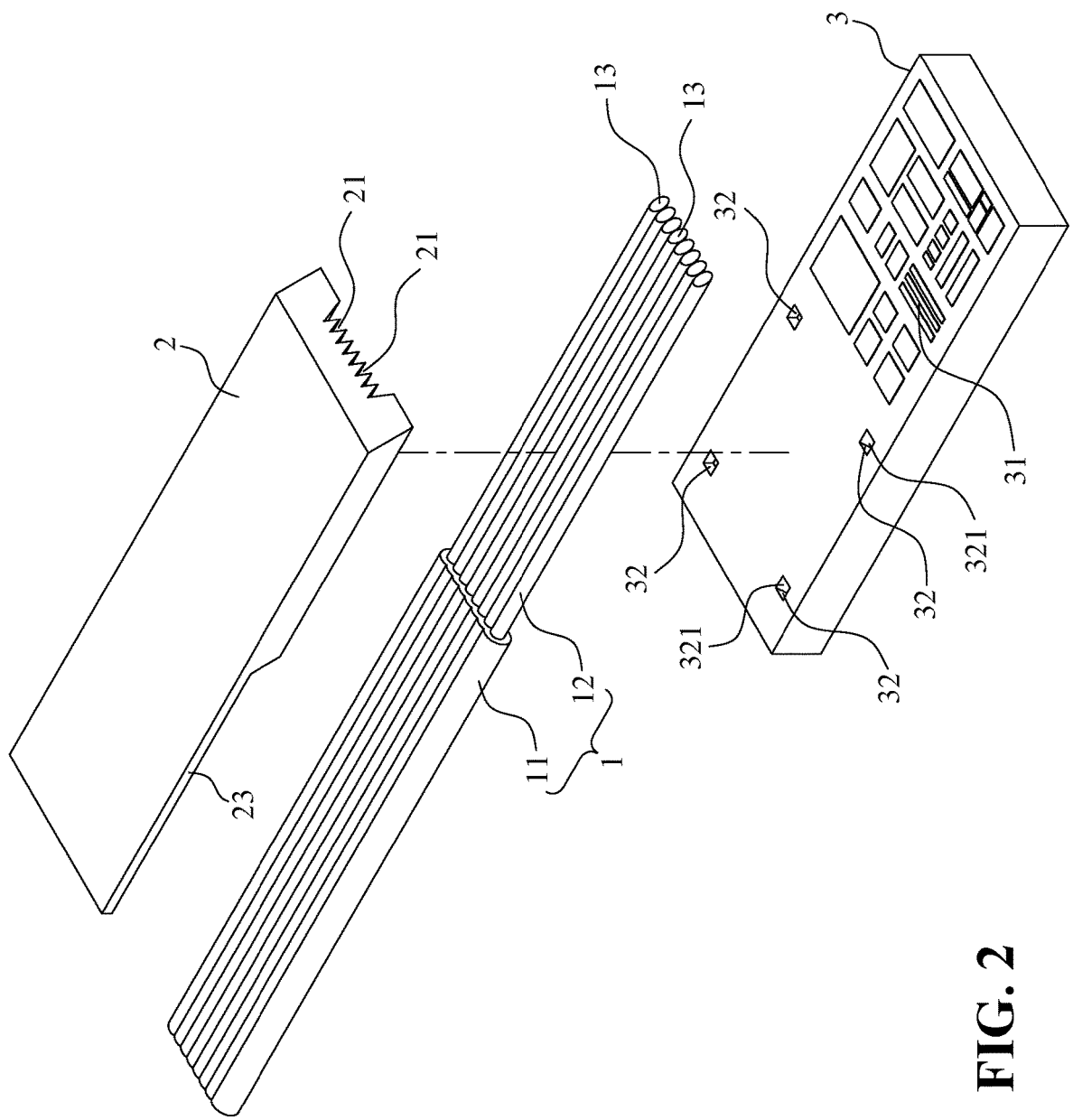
FIG. 2 is an exploded view of the first embodiment of an alignment structure of optical element of the present invention.
Figure 3:
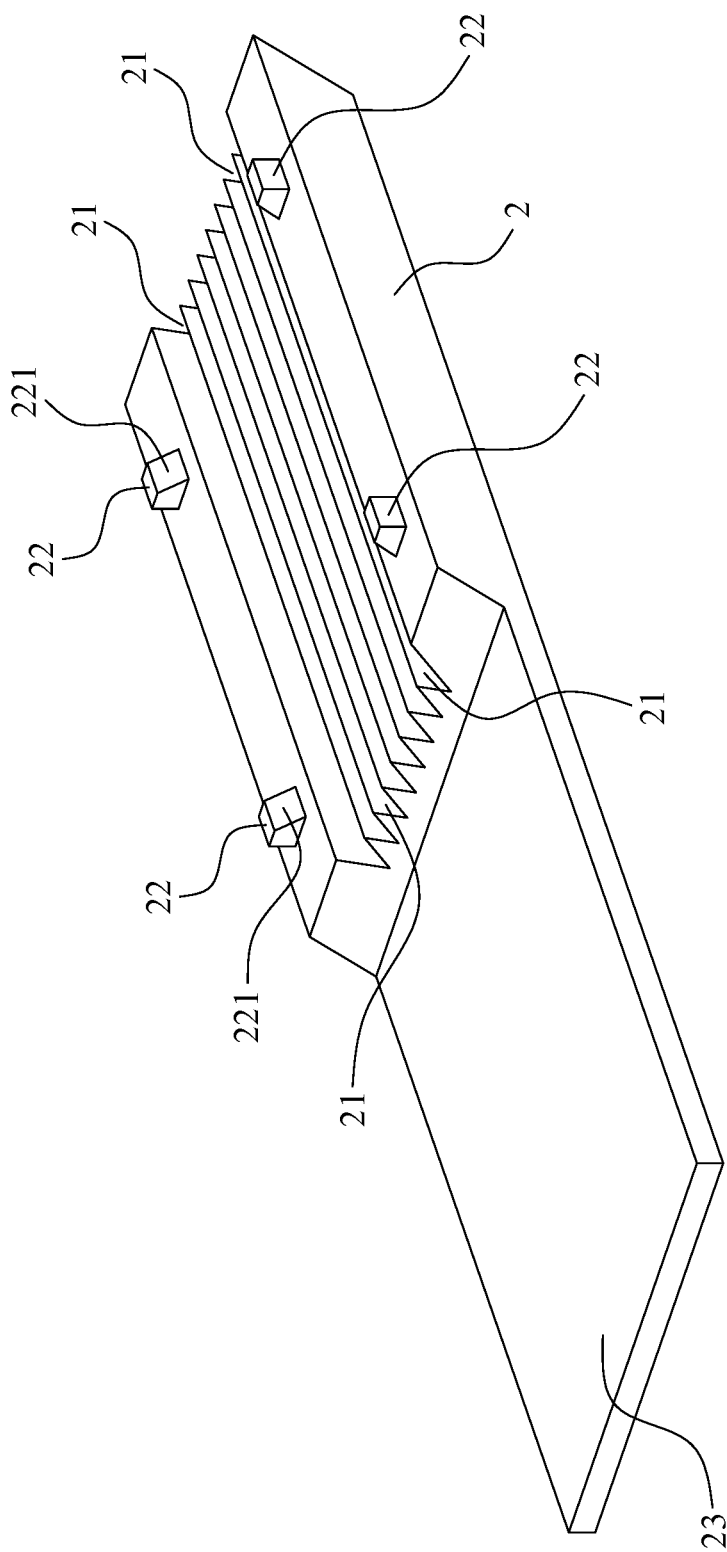
FIG. 3 is a perspective view of the cover plate of the first embodiment of the alignment structure an optical element of the present invention.

FIG. 1, FIG. 2, and FIG. 3 are respectively a perspective view, an exploded view, and a perspective view of a cover plate of an alignment structure of an optical element of the first embodiment of the present invention. The alignment structure of optical element of the present invention includes an optical fiber 1, a cover plate 2, and a silicon chip 3. The optical fiber 1 includes a parallel fiber segment 11 and a bare fiber segment 12. The cover plate 2 is provided with a plurality of guide grooves 21 and a plurality of coupling parts 22 arranged side by side. The bare fiber segment 12 of the optical fiber 1 is arranged in the corresponding guide groove 21 during assembly, and the cross-sectional shape of the guide groove is at least one of U-shaped or V-shaped. The surface of the silicon chip 3 facing the cover plate 2 is provided with a circuit 31 and a plurality of second coupling parts 32. When the cover plate 2 covers to match with the silicon chip 3, the first coupling parts 22 and the second coupling parts 32 are coupled and positioned with each other, and the optical fiber 1 is accurately fixed between the silicon chip 3 and the cover plate 2.

The following is a brief description of the structure and processing method of each component:

The optical fiber 1 is a single-modal or multi-modal optical fiber, including a combined fiber segment 11 with a protective layer on the periphery and a plurality of bare fiber segments 12 from which the protective layer has been removed. In the present embodiment, the end of the bare fiber segment 12 is ground or cut by to form an acute-angled reflective surface 13.

The cover plate 2 is formed with a plurality of side-by-side recessed guide grooves 21 in the middle of one surface, and a plurality of first coupling parts 22 are formed on both sides of guide grooves on this surface respectively. The cross-sectional shape of the guide grooves 21 is at least one of U-shaped or V-shaped, and in the present embodiment, the guide groove 21 is a V-shaped groove. The size of the single guide groove 21 corresponds to the size of one bare fiber segment 12, which facilitates accurate positioning of the center of the plurality of bare fibers 12. In the present embodiment, the first coupling part 22 is a positioning protrusion formed on the surface of the cover plate 2 and protrudes upward. The positioning protrusion is a polygonal body, but at least one side of which is an inclined surface 221 to facilitate automatic positioning and calibration during assembly. A thin substrate 23 extends from one side of the cover plate 2, and the thin substrate 23 can contact with and fix the parallel fiber segments 11 of the optical fibers 1 during assembly, so as to maintain the overall firmness.

The manufacturing method of the cover plate 2 can use a semiconductor process, such as taking a silicon wafer, pre-growing silicon dioxide/silicon nitride as a hard mask, and then spin-coating a photoresist, and a mask designed with a pattern corresponding to the fiber size is exposed on the photoresist. After developing and cleaning, the silicon dioxide hard mask is wet-etched with hydrofluoric acid (HF)/phosphoric acid (H3PO4), and the photoresist is cleaned and removed to expose the silicon in the area to be etched. The heated potassium hydroxide (KOH) wet-etches silicon. By utilizing the etching anisotropy of KOH to the silicon wafer surface, a smooth surface and a plurality of V-shaped guide grooves 21 and first coupling parts 22 are formed by etching. However, this is only one of the processing methods of the present invention, and the present invention is not limited to herein. For example, glass raw material can also be used for the cover plate 2, and then hot-pressed into the designed shape during the processing.

The silicon chip 3 is an integrated circuit (IC) chip manufactured by a semiconductor process. In addition to the lines 31 formed on the surface, a plurality of second coupling parts 32 are also formed. The number, the positions and the shapes of the second coupling parts 32 match those of the first coupling parts 22. In the present embodiment, the second coupling part 32 is a positioning groove that is recessed downward on the surface of the silicon chip 3. The positioning groove also has an inclined surface 321 at a corresponding position to match the inclined surface 221 of the first coupling part 22.

In the above embodiment, the first coupling part 22 is formed on the surface of the cover plate 2 with an upwardly protruding positioning protrusion, and the second coupling part 32 is formed with a downwardly recessed positioning groove on the surface of the silicon chip 3, but the present invention is not limited to herein, and can also be changed to: the first coupling part 22 forms a downwardly recessed positioning groove on the surface of the cover plate 2, and the second coupling part 32 formed on the surface of the silicon chip 3 must be an upward protruding part. This structural feature is also applicable to subsequent related embodiments.

The alignment structure of optical element of the present invention has the advantages of simplifying the assembly process and maintaining accurate alignment. The assembly method is to temporarily fix the bare fiber segments of the optical fiber 1 in the guide grooves 21 of the cover plate 2 with light-curing glue. After that, the optical fiber 1 and the cover plate 2 are pressed down on the silicon chip 3, and the first coupling parts 22 and the second coupling parts 32 are coupled and positioned with each other. Through the face-to-face pressed sliding of inclined surface 221 and the inclined surface 321, the alignment and the positioning can be accomplished rapidly, which greatly shortens the previous calibration and alignment time and improves the efficiency of assembly and alignment. The bonding of the two can also be partially coated with glue in advance, and then apply UV irradiation to the light-curing glue after bonding, which can be fast and accurately fix the position of each component.

Figure 4:
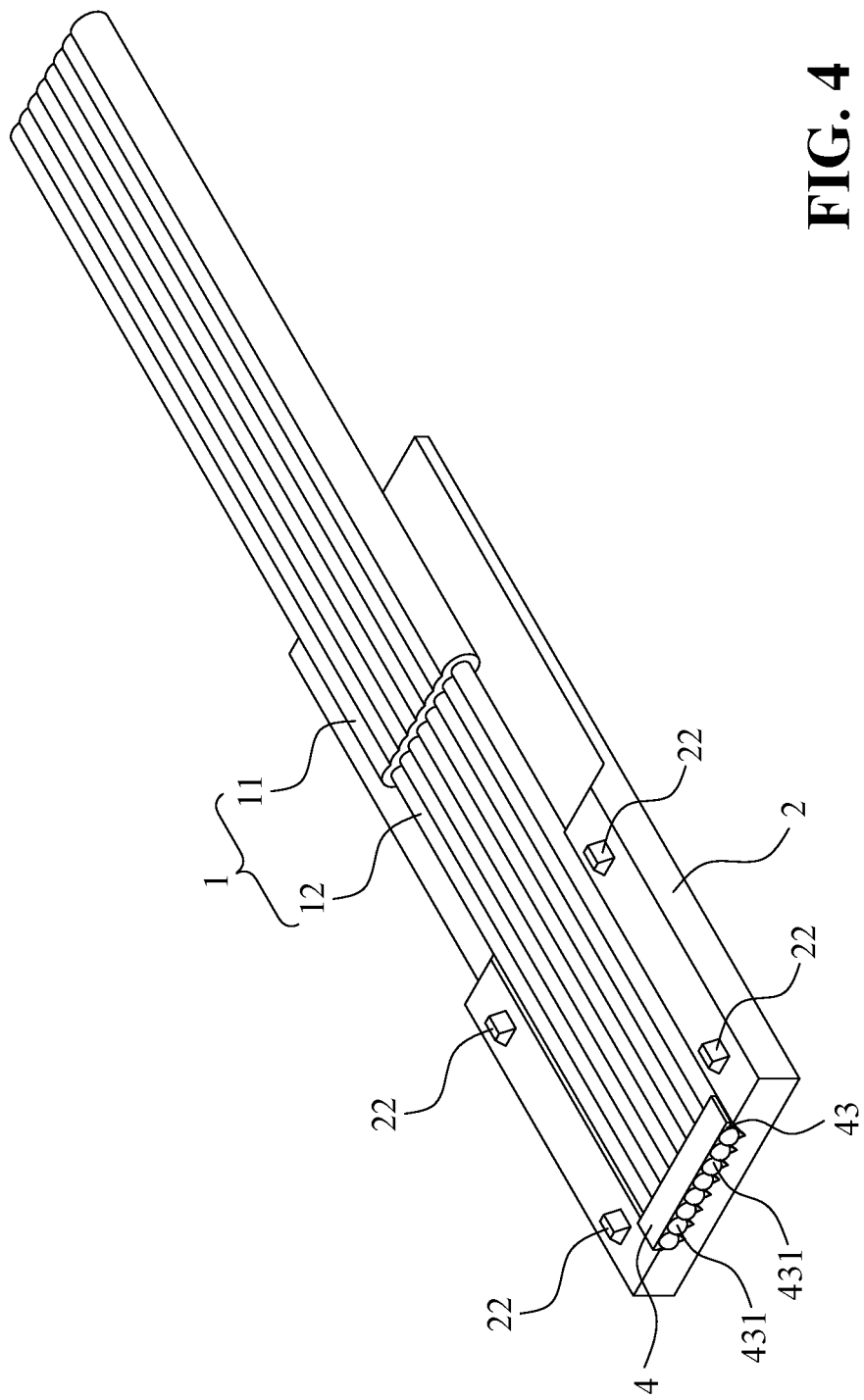
FIG. 4 is a perspective view of the cover plate, optical fiber and lens in a second embodiment of an alignment structure of optical element of the present invention.
Figure 5:
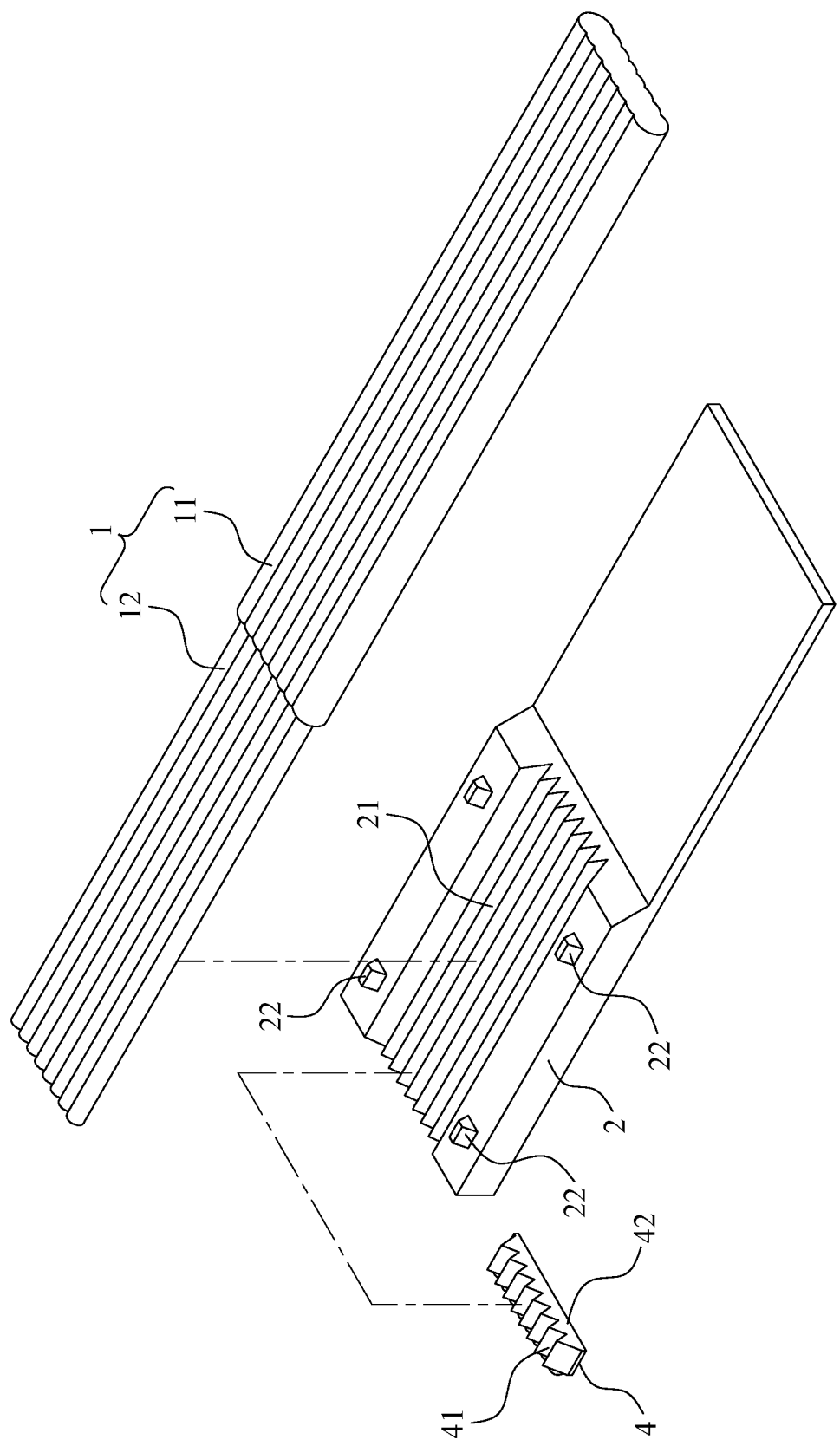
FIG. 5 is an exploded view of the cover plate, optical fiber and lens in the second embodiment of an alignment structure of optical element of the present invention.

FIG. 4 and FIG. 5 are respectively a perspective view and an exploded view of the cover plate, optical fiber and lens of the second embodiment of the alignment structure of optical element of the present invention. In the present embodiment, a lens 4 is added. The lens 4 enables the optical signal to be effectively transmitted to other optical elements. Therefore, the lens 4 can be at least one of a through lens, a refractive lens or a reflective lens, depending on the purpose of application. In the present embodiment, the lens 4 is a through lens. In order to facilitate assembly, in the present embodiment, the lens 4 is installed on the guide groove 21 of the cover plate 2 and is connected to the bare fiber segment 12 of the optical fiber 1, so the end face of the bare fiber segment 12 at the connection is a vertical light emitting surface. The lens 4 is also formed with a mounting convex portion 41. The shape of the mounting convex portion 41 is to match the shape of a plurality of guide grooves 21 arranged side by side. For example, if the guide groove 21 is V-shaped, the mounting convex portion 41 is serrated; if the guide groove 21 is U-shaped, the mounting convex portion 41 has a circular arc wave shape. The other two sides of the vertical surface of the lens 4 form an optical fiber passive alignment surface 42 and an optical light emitting surface 43. The optical fiber passive alignment surface 42 is used for the laser light source provided by the bare fiber segment 12 to enter, and then the light is refracted or passing through by the material of the lens 4, and finally emitted through the optical light emitting surface 43. In the present embodiment, the optical light emitting surface 43 also forms a plurality of convex lenses 431, and each convex lens 431 focuses a light signal to output.

Figure 6:
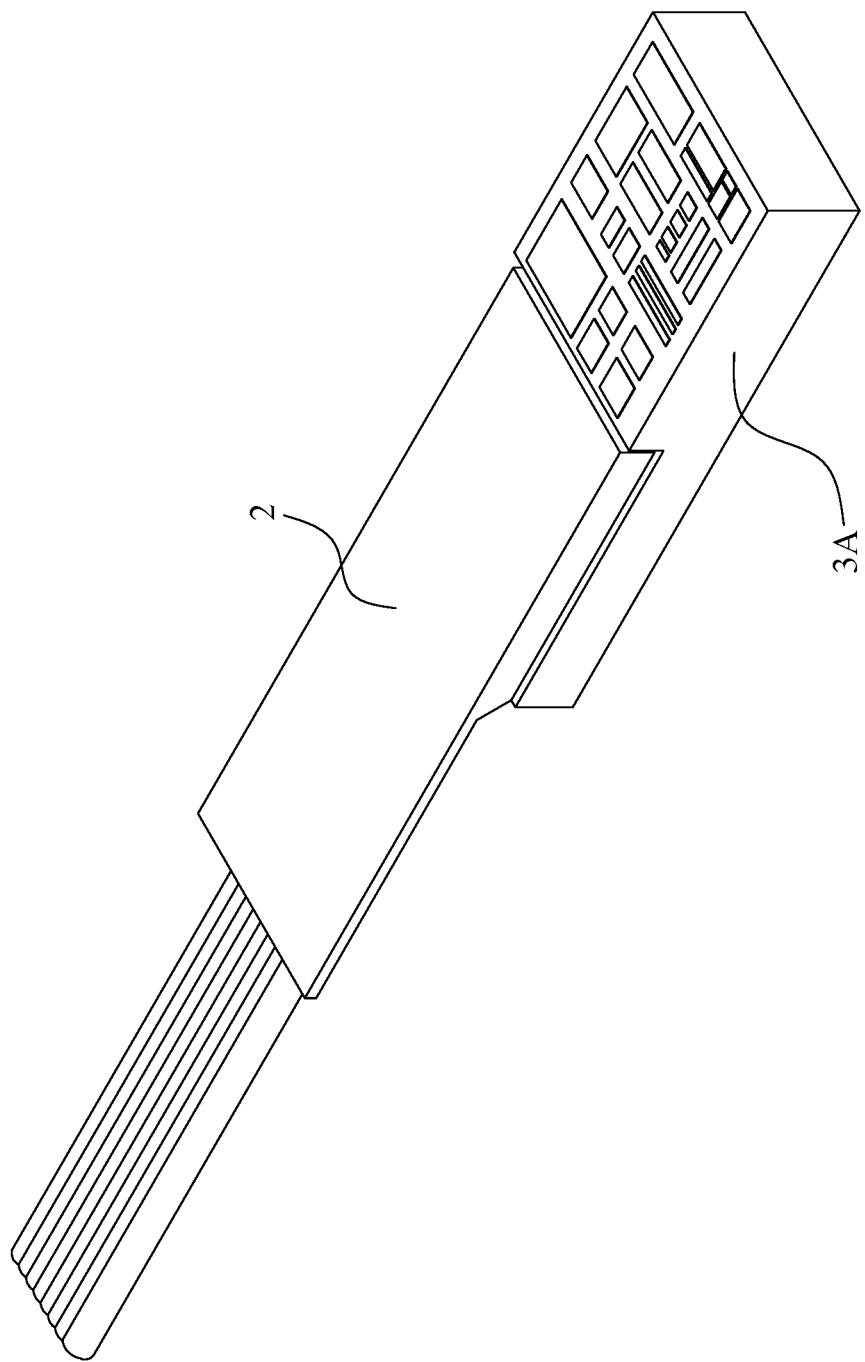
FIG. 6 is a perspective view of the second embodiment of an alignment structure of optical element of the present invention.
Figure 7:
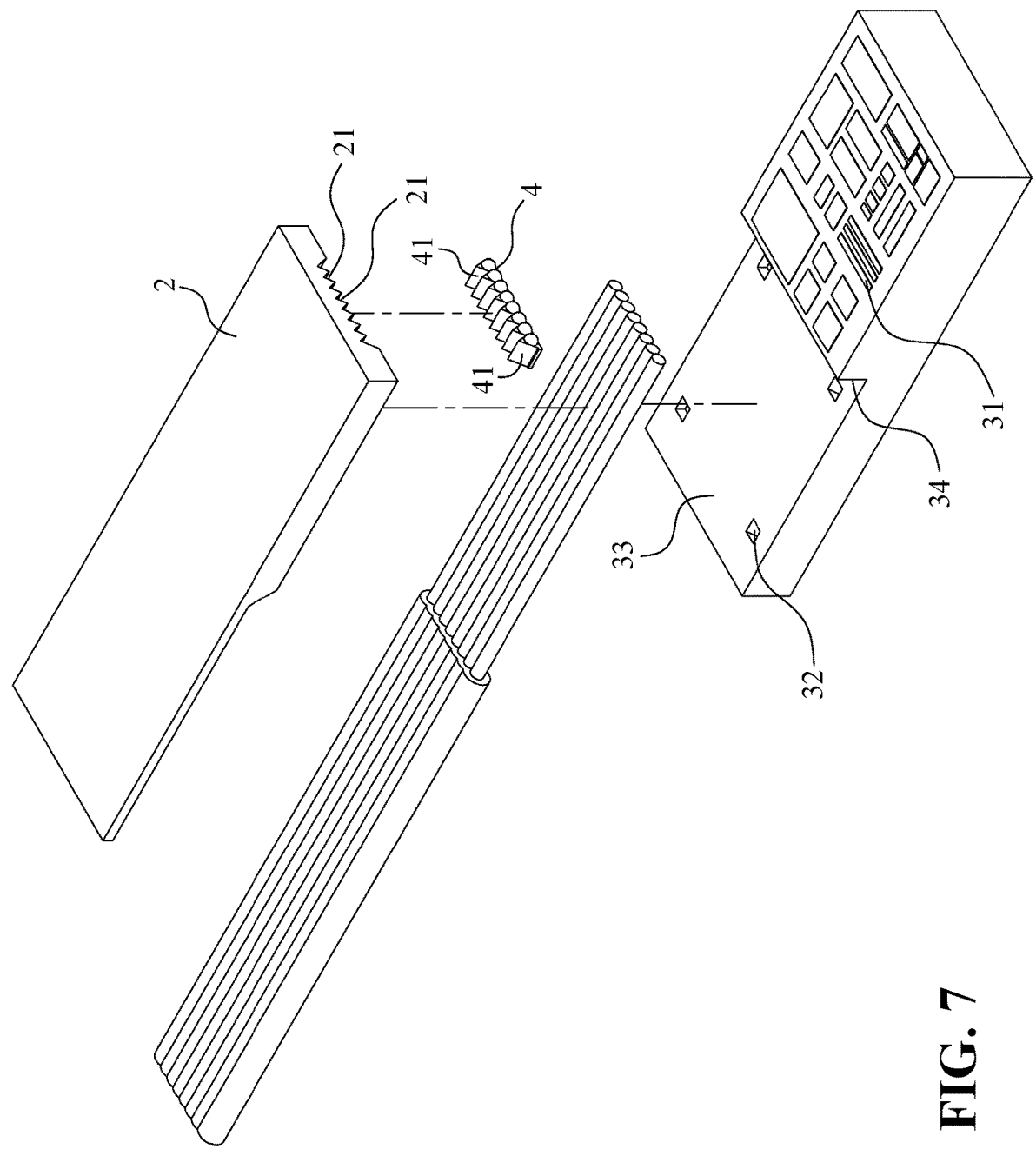
FIG. 7 is an exploded view of the second embodiment of an alignment structure of optical element of the present invention.

As shown in FIG. 6 and FIG. 7, since the optical signal transmission path of the second embodiment is linear, the structure of the silicon chip 3A to be mounted is also changed correspondingly. The silicon chip 3A of the present embodiment has a mounting platform 33 with a stepped drop. The second coupling parts 32 in the present embodiment are reconfigured at the mounting platform 33, and the related lines 31 of the silicon chip 3A will also extend to the vertical wall surface 34 perpendicular to the mounting platform 33. The lines 31 and the electronic components located on the vertical wall surface 34 can receive the light signal output by the lens 4. The assembly method is to first glue the optical fiber 1 and the lens 4 to the guide groove 21 of the cover plate 2, and then place the cover plate 2 on the mounting platform 33 from the top. Through the coupling and positioning of the first coupling part 22 and the second coupling part 32, the optical fiber 1, the lens 4 and the silicon chip 3 can be accurately positioned.

Figure 8:
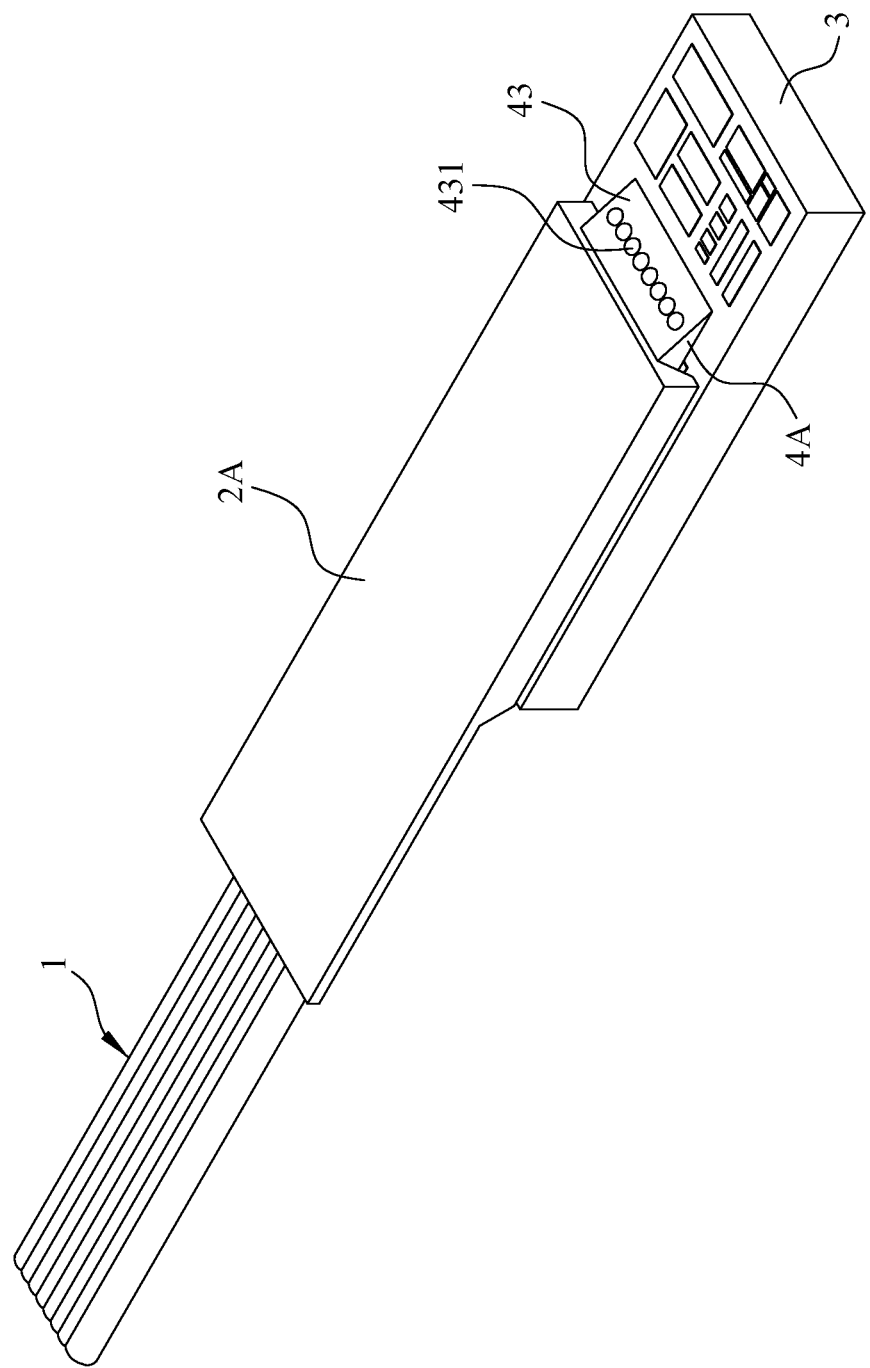
FIG. 8 is a perspective view of a third embodiment of an alignment structure of optical element of the present invention.
Figure 9:
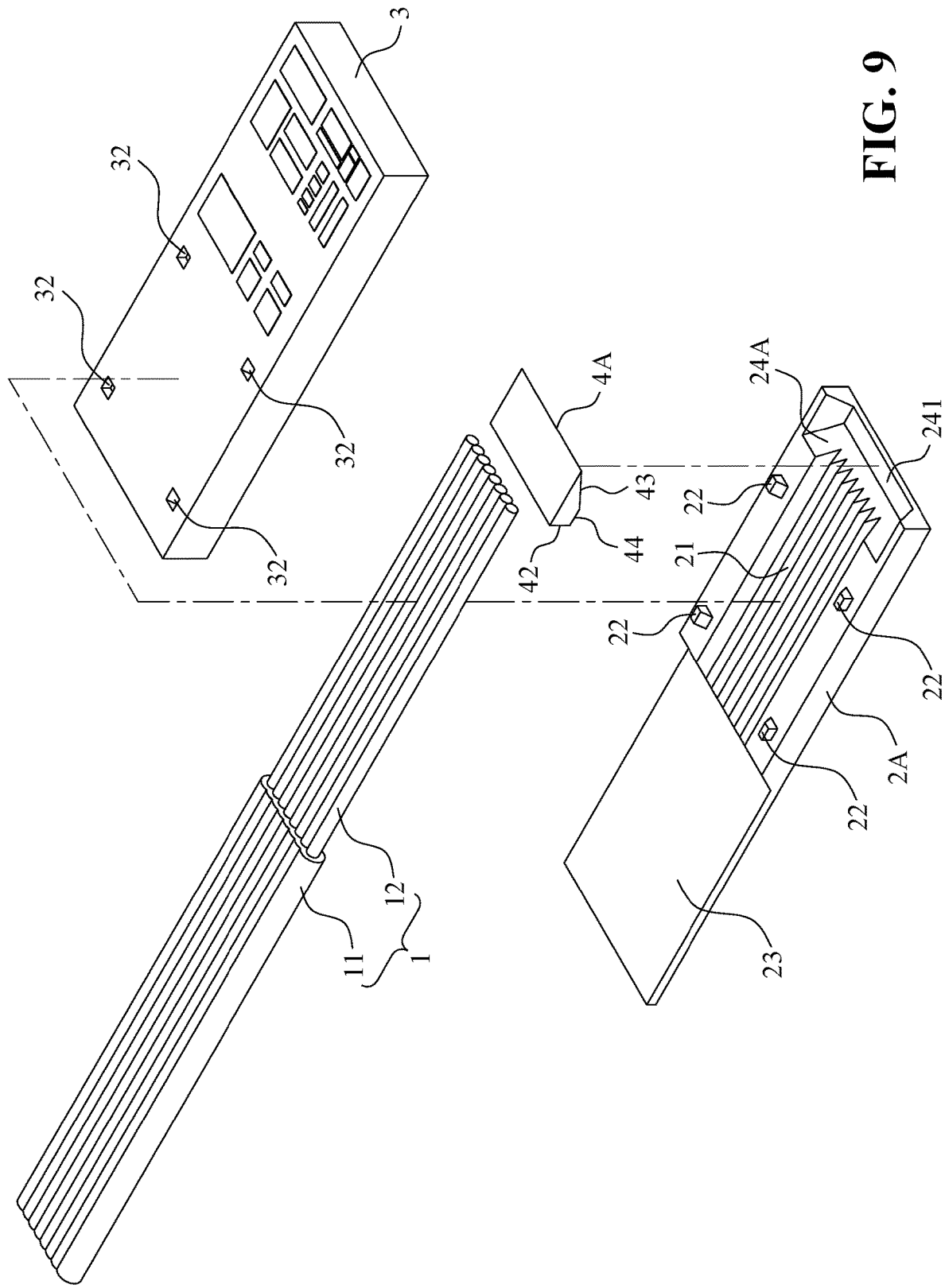
FIG. 9 is an exploded view of the third embodiment of an alignment structure of optical element of the present invention.

FIG. 8 and FIG. 9 are respectively a perspective view and an exploded view of the third embodiment of the alignment structure of optical element of the present invention. In the present embodiment, a lens 4A is still provided, and the lens 4A also enables the optical signal to be transmitted effectively. Therefore, the lens 4A can be at least one of a through lens, a refractive lens or a reflective lens, depending on the application. However, in the present embodiment, the shape and installation position of the lens 4A are different from those in FIG. 4, and the other components are also changed correspondingly. For example, the cover plate 2A also forms a concave alignment groove 24A. The alignment groove 24A is adjacent to the exit position of the guide groove 21. The longitudinal dimension of the alignment groove 24A is a tapered hole that gradually decreases from the outside to the inside. Therefore, the alignment groove 24A has the smallest size at the groove bottom surface 241, and the lens 4A has a flat mounting surface 44. The size and shape of the mounting surface 44 matches that of the groove bottom surface 241. The lens 4A has an optical fiber passive alignment surface 42 and an optical light emitting surface 43 on two sides. The passive alignment surface 42 is for the entry of the laser light source provided by the bare fiber segment 12, and then the light is refracted by or passing through the material of the lens 4A, and finally outputted through the optical light emitting surface 43. In the present embodiment, the optical light emitting surface 43 has a specific angle and the surface also forms a plurality of convex lenses 431 and so on.

Figure 10:
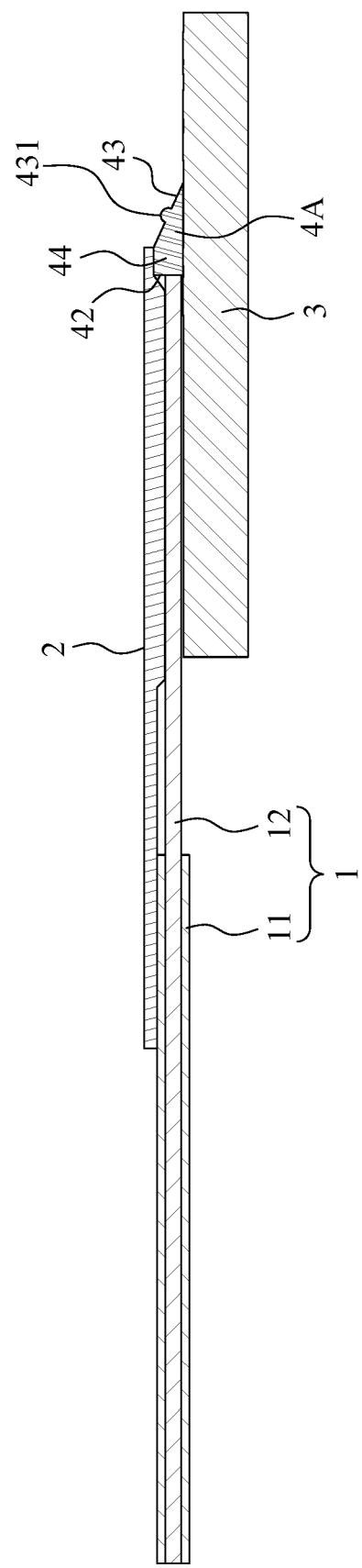
FIG. 10 is a longitudinal cross-sectional view of a third embodiment of an alignment structure of optical element of the present invention.

Also refer to FIG. 10. The assembly process of the third embodiment is as follows: temporarily fix the bare fiber segment 12 of the optical fiber 1 in the guide groove 21 of the cover plate 2A with a light-curing glue, and then place the lens 4A with the mounting surface 44 coated with light-curing glue in alignment with the aforementioned alignment groove 24A; and then utilize the shape of the tapered hole to quickly guide the mounting surface 44 to be accurately fixed on the groove bottom surface 241 to achieve preliminary alignment and assembly. The optical fiber 1 and the cover plate 2A are then pressed down on the silicon chip 3, so that the first coupling part 22 is located in the second coupling part 32, and the two can be precisely fixed. Finally, after the positions of the components are confirmed, UV light curing is applied to the glue to achieve the rapid assembly.

Figure 11:
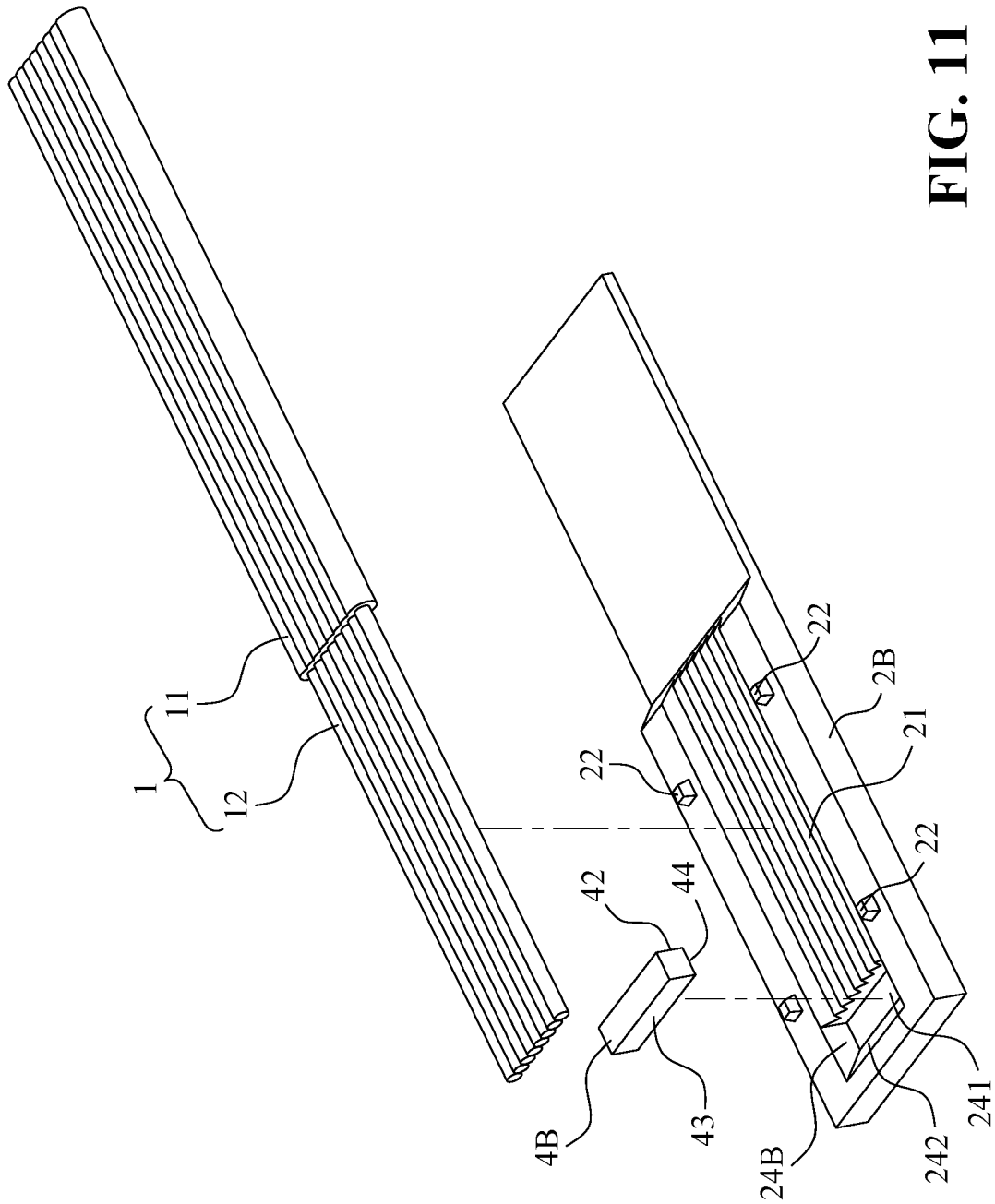
FIG. 11 is an exploded view of the cover plate, optical fiber and lens of a fourth embodiment of an alignment structure of optical element of the present invention.

As shown in FIG. 11, in the fourth embodiment of the present invention, the shape of the alignment groove 24B of the cover plate 2B is improved in the present embodiment. In the present embodiment, the alignment groove 24B does not penetrate the cover plate 2B laterally, the opening direction of the alignment groove 24B is the same as the opening direction of the guide groove 21. The alignment groove 24B is for inserting the lens 4B of the corresponding shape. The lens 4B is joined by the mounting surface 44 and the groove bottom surface 241. The optical fiber passive alignment surface 42 is connected to the bare fiber segment 12, and the optical light emitting surface 43 is used as an optical signal output. A reflective film is formed in the semiconductor process of the cover plate 2B, thereby simplifying the production process and reducing the production cost.

In summary, the alignment structure of optical element of the present invention utilizes the second coupling part of the silicon chip, the first coupling part and the guide groove of the cover plate to position each other during the optical fiber assembly, so as to shorten the calibration and alignment time; thereby, improving the assembly time and efficiency, and meeting the requirements of the patent application.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An alignment structure of optical element, comprising:
    an optical fiber, having a parallel fiber segment and a plurality of bare fiber segments;
    a cover plate, provided with a plurality of side-by-side guide grooves and a plurality of first coupling parts, the bare fiber segments of the optical fiber being arranged in corresponding guide grooves, cross-sectional shapes of the guide grooves being at least one of U-shaped or V-shaped, and the cover plate being formed with an alignment groove located at one end of the guide grooves;
    a lens, the lens being at least one of a through lens, a refractive lens or a reflective lens; and
    a silicon chip, provided with lines and a plurality of second coupling parts, the lines being for receiving light signals output from the lens; when the cover plate is matched with the silicon chip, the first coupling parts and the second coupling parts being coupled and positioned with each other respectively, the lens being arranged in the alignment groove and fixed between the cover plate and the silicon chip during assembling and the optical fiber being fixed between the silicon chip and the cover plate;
    wherein the lens forms a flat mounting surface, a longitudinal direction of the alignment groove is a tapered hole, the flat mounting surface has a shape matches with the shape of a bottom surface of the alignment groove and when the lens is placed in the alignment groove, the flat mounting surface accurately fits the bottom surface of the alignment groove.

2. The alignment structure of optical element according to claim 1, wherein each of the first coupling parts is a positioning protrusion formed upwardly on a surface of the cover plate, and each of the second coupling parts is a positioning groove formed downwardly on a surface of the silicon chip.

3. The alignment structure of optical element according to claim 2, wherein the positioning protrusion has at least one inclined surface, and the positioning groove also has an inclined surface at a corresponding position.

4. The alignment structure of optical element according to claim 1, wherein each of the first coupling parts is a positioning groove formed downwardly on a surface of the cover plate, and each of the second coupling parts is a positioning protrusion formed upwardly on a surface of the silicon chip.

5. The alignment structure of optical element according to claim 1, wherein the plurality of side-by-side guide grooves are formed in the middle of the cover plate, and the plurality of first coupling parts are formed on both sides of a surface of the cover plate.

6. The alignment structure of optical element according to claim 1, wherein the cover plate extends with a thin substrate, and the thin substrate can be fixed in contact with the parallel fiber segment of the optical fiber to maintain overall firmness.

* * * * *